United States Patent Office 2,975,815
Patented Mar. 21, 1961

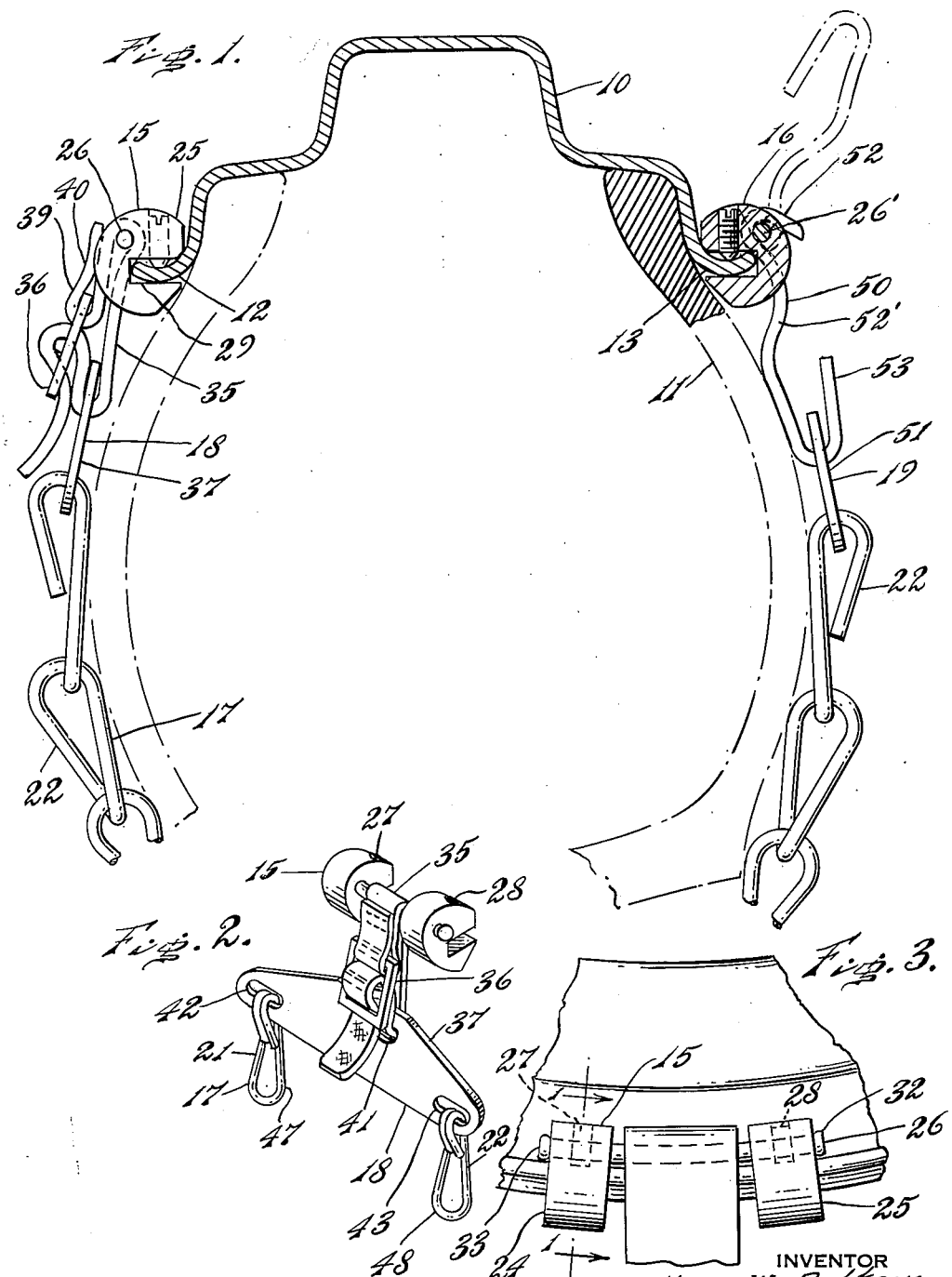

2,975,815
TIRE CHAIN SETUP
Harry W. Rettew, 400 West Ave., Jenkintown, Pa.
Filed Oct. 9, 1959, Ser. No. 845,552
4 Claims. (Cl. 152—236)

My invention relates to arrangements to prevent skidding and secure traction for automotive vehicles.

A purpose of my invention is to provide an improved such arrangement.

A further purpose of my invention is to provide a tire chain setup in which the tire chains can be unusually easily and quickly put on and taken off whenever that is necessary.

A further purpose is to provide a tire chain setup in which, despite the above ready application and removal of the chains, the chains stay on quite firmly and well as long as desired, and no alteration to the rim is required and no damage done to the tire by the way in which the chain is attached, yet the items additional to the tire and rim are comparatively simple and inexpensive.

A further purpose is to mount an end of the tire chain setup to the rim by a hook which engages an anchorage in a position from which the hook cannot detach without rotating around a pivotal connection, which rotation it is not free to accomplish as long as the tire chain setup remains in place, and which rotation will not occur of itself even should the other end of the tire chain setup become entirely disconnected.

A further purpose is to provide a pivot bar interconnecting anchorage blocks on the rim, which bar is capable of elastically deflecting to adapt the installation to the curvature of the particular rim.

Further purposes will appear in the remainder of the specification and in the claims.

My invention is illustrated in the drawings by a particular embodiment chosen from the standpoints of convenience in illustration, satisfactory operation and clear demonstration of the principles involved.

Figure 1 is a fragmentary view of my invention with the rim and tire in cross section and the attachments thereto, including the chain, in elevation, except that on one side the block and rod are in section along the line 1—1, also showing the fastening screw.

Figure 2 is a perspective view of part of my invention.

Figure 3 is a fragmentary view from the outside of the tire of part of my invention.

Describing in illustration but not in limitation and referring to the drawings:

Tire rim 10 on a wheel of an automotive vehicle (not shown) has tire 11 (shown partly in phantom) mounted on it in the conventional manner. In the illustration shown the tire is a tubeless tire but may equally well be a tire having an inner tube. The rim is conventional in form, with outwardly extending flanges 12 and 13.

On the rim is mounted mounting or attaching members 15 and 16, attaching member 15 being mounted on flange 12 and attaching member 16 on flange 13.

On attaching members 15 and 16 is mounted double chain arrangement 17, made of end member 18 mounted on attaching member 15 and end member 19 mounted on attaching member 16 and the two chains 21 and 22 each stretching around the tire between the end members.

Attaching member 15 is made up of anchor blocks 24 and 25, pivot rod 26 stretching between them, and Allen head set-screws 27 and 28. When reference is made herein to Allen head set-screws 27 and 28, it is intended to indicate any suitable hollow head set-screw which is adapted to cooperate with a tool such as a wrench. The blocks are each more or less cylindrical in general outline with the side toward the tire cut away.

On this cut-away side is the large inwardly-extending recess or slot 29 which extends inward from the cut-away face below the center of the cylindrical outline and is large enough to accommodate the flange of the rim. Above the slot the cut-away portion is simply a flattened-off portion, except right close to the slot, where the corner between face and slot is bevelled, while below the slot, the cut-away portion extends back in an underslung manner with the angle between this underslung face and the slot being flattened off.

The blocks also have a hole more or less above the inner end of the slot and running parallel to the center line of the cylindrical outline of the block, to accommodate rod 26, and holes extending vertically down into the slot and internally screw-threaded, to accommodate the Allen head screws. Rod 26 extends completely through holes in both anchor members or blocks 24 and 25. While if desired the rod 26 may be initially curved to fit a certain rim or may remain straight throughout, the rod 26 will preferably be initially straight and will adapt itself to the curvature of the particular rim by elastically deflecting when the anchor members or blocks 15 and 16 are tightened to conform generally with the curvature of the rim. The same applies to rod 26' (hereinafter mentioned) and the anchor members or blocks forming part of attaching member 16. Between the anchor members or blocks each rod is slightly larger in cross section than the holes for it in the blocks and within the blocks is noticeably smaller in cross section, in order to pass through these holes. The blocks are flush against the shoulders between these two different cross sections, and knobs 32 and 33 on the rod beyond the outer ends of the holes, formed by any convenient method such as peening the ends, hold the blocks on the rod. It will be evident that the formation of knobs 32 and 33 on the rod is an optional feature which need not be used unless particularly desired.

The blocks are mounted on flange 12 of the rim by inserting the blocks on the flange with the flange extending fully into the slot and tightening set-screws 27 and 28 down against the top of the flange, which will normally be concave.

Attaching member 16 is a counterpart of attaching member 15, with rod 26', blocks (only one of which is shown), and Allen head set-screws (only one of which is shown), and is placed in a corresponding position on the opposite side of the rim, attached to flange 13 in the same manner as attaching member 15 is to flange 12.

When attached, the bevelled edge on the upper part of the blocks will be against the flange in the case of each attaching member, the bottom of the flange opposite its concave part will be against the bottom of the slot, and the lower cut-away part of the blocks will clear completely from the tire.

End member 18 consists of strap 35, buckle 36 and plate 37. Strap 35 is attached at one end 39 by means of loop 40 to buckle 36 and then passes around rod 26 and down around through slot 41 in flat plate 37 and then back up through the buckle in the conventional manner to secure it. It can be of any suitable strap material strong enough and durable enough to do the job, such as heavy webbing or canvas of the type normally used in such straps, and should be substantially less wide than the distance between the blocks 27 and 28 so as to allow a certain amount of space between the strap and the blocks when it is in a central position on the rod. Plate 37 is a flat plate more or less in the shape of a rather squat isosceles trapezoid with the bottom corners rounded off, and in addition to the slot 41 already mentioned, which is up near the top, extending across more or less parallel to the circumference of the tire at that point, has two horizontal slots 42 and 43 respectively near the opposite bottom corners, which latter are approximately parallel to the first. End link 47 of chain 21 extends through and is held swingably in slot 42 and end link 48 of chain 22 extends through and is held swingably in slot 43.

End member 19 consists of holder 50 and plate 51. Holder 50 is in the form of a plate, with two ends bent around hook fashion, the body of the plate being on the side toward the rim and the tire, and the hook ends being on the side remote from the rim and the tire, so that the tire is protected against contact with the hook ends. At the end adjoining the rim, hook end 52 is formed, and between the hook end 52 and the body of the holder 50 is a bend 52', bringing the body of the plate close in and in general conformity to the adjoining contour of the tire. The hook end 52 engages the rod 26' in the manner of a pivot, and in order to insert the hook end around the rod it is necessary to rock the holder 50 to a position as shown in dot-and-dash lines in Figure 1, when the outer hook portion of the hook end can extend in between the rod 26' and the rim. The bend 52' avoids the possibility that the holder 50 might interfere with the brake drum or brake operating mechanism when it is in the dot-and-dash position of Figure 1. When the holder 50 is rocked to its normal operation position in Figure 1 it is not possible to detach the hook end from the rod 26', since any upward motion without corresponding rocking motion simply brings the body of the holder 50 closer to the rod 26'. The rod 26' thus is held with a certain amount of freedom or looseness in the bight of the hook.

The lower hook portion 53 extends through a slot in the top of plate 51, which is a counterpart of plate 37. As in the case of strap 35 around rod 26, hook portion 52 of holder 50 has substantial space between its edges and the blocks when it is in central position on rod 26'.

The end links of the chains 21 and 22 which are at the opposite end from end links 47 and 48 extend respectively through two other slots in plate 51 in the same fashion that end links 47 and 48 extend through slots 42 and 43 in the plate 37, and fasten the two chains at the other end to plate 51.

In use, the attaching members can readily be put on the rim by inserting them with the flanges of the rim in the respective slots and tightening down the Allen head screws. The hook member 50 of the double chain arrangement can be then hooked over the rod of attaching member 16, and the strap, with its free end detached from the buckle, can then be put over the rod 26 and the strap be brought through the slot 41 and through its buckle and the chains tightened in position around the tire.

When the immediate situation which has required the used of tire chains has ceased, the double chain arrangement can be very easily and quickly removed, leaving the attaching members on the rim for ease of future attachment. The attaching members can thus remain on the rim all winter or indeed, if desired, indefinitely, without any interference with or injury to the normal action of the wheel.

Thus, we have a tire chain setup which is very easy and quick to put on and remove, yet quite secure as long as it is on, comparatively simple and inexpensive, relatively tamper-proof, and causing no difficulties with or added wear to the tire. It does not require any alteration of the rim structure, such as drilling a hole therein, which would be relatively difficult for the ordinary individual to do; but is something which many individual car owners would find they could quite readily do themselves without recourse to a garage.

It will be understood that the invention provides a very simple, inexpensive and convenient device which is applicable to a wide variety of vehicles, including automobiles, trucks, farm machinery, military vehicles, buses, fire equipment, motorcycles and scooters, and the like, and that it is applicable to wheels including disc wheels and spoke wheels, and also to tires which may be either tubeless tires or tires provided with inflatable tubes.

In view of my invention and disclosure, variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. An arrangement for securing traction and prevention of skidding in automotive vehicles having tires, comprising a tire rim with two outwardly extending flanges, one at each edge, a tire mounted on said rim, with said flanges of the rim extending out away from the tire, two mounting members each of which has two blocks and a rod attached to each block and extending between the blocks and holding them in a fixedly spaced interrelation, the blocks each having a recess into which one of the said flanges extends and a screw extending through the blocks through one face of the recess and against the flange to hold it between the screw point and the other face of the recess, the block being completely out of contact with the tire, and the rod having a curvature approximately corresponding to that of the flange and being located substantially closer to the tire than the outermost portions of the blocks, a holding member in the form of a band having one end bent around hook fashion and back approximately parallel to the tire and holding the rod of one of the mounting members loosely within the bight of the hook and having substantial space between its edges and the blocks when it is in central position of the rod, a first plate attached to the other end of the holding member, two chains each attached to a different part of the plate and extending approximately parallel to each other around the tread of the tire, a second plate attached to the opposite end of the two chains, a strap attached to the second plate and passing around the rod of the other mounting member, with substantial space between the edges of the strap when in central position and the blocks, and a buckle attached to one end of the strap and holding the other end removably and adjustably therein.

2. An arrangement for securing traction and preventing skidding for use on tires having rims, comprising a first mounting member for one side of the tire which has two metal blocks and a rod extending between said blocks and fastened to each of the blocks, the blocks having recesses adapted to receive the edge of the rim, and the blocks having fastening means adapted to removably fasten the blocks in position on the rim with the edge of the rim in the recesses, an opposite mounting member on the other side of the rim, and a chain setup having at one end a hook provided with a body adjoining the rim and provided with a reversely bent hook end which extends outwardly from the body around the rod of the first mounting member, said hook end being insertable around the rod only in the position in which the hook is rocked to a location transverse with respect to the adjacent side of the tire, and being non-removable from the rod when the hook lies in a position generally parallel to the adjacent side of the tire, said chain setup also including anti-skid chain means and means for connecting the chain setup with the opposite mounting member.

3. An arrangement for securing traction and preventing skidding for use on tires having rims, comprising a first mounting member for the inner side of the tire under the vehicle which has two metal blocks and a rod extending between said blocks and fastened to each of the blocks, the blocks having recesses adapted to receive the edge of the rim, and the blocks having fastening means adapted to removably fasten the blocks in position on the rim with the edge of the rim in the recesses, an opposite mounting member on the outside of the rim, and a chain setup having at the inner side of the tire under the vehicle a hook provided with a body adjoining the rim and provided with a reversely bent hook end which extends outwardly from the body around the rod of the mounting member, said hook end being insertable around the rod only in the position in which the hook is rocked to a location transverse with respect to the inner side of the tire under the vehicle, and being non-removable from the rod when the hook lies in a position generally parallel to the inner side of the tire under the vehicle, said chain setup also including anti-skid chain means and means for connecting the chain setup with the mounting member at the outside of the rim.

4. An arrangement for securing traction and preventing skidding for use on tires having rims, comprising a first mounting member for the inner side of the tire under the vehicle which has a rod-like element and mounting attachments to the rim at opposite ends of the rod-like element, the rod-like element extending in the direction of a chord of the rim circle, an opposite mounting member on the outside of the rim, and a chain setup having at the inner side of the tire under the vehicle a hook provided with a body adjoining the rim and provided with a reversely bent hook end which extends outwardly from the body around said rod of the mounting member, said hook end being insertable around the rod only in the position in which the hook is rocked to a location transverse with respect to the inner side of the tire under the vehicle, and being non-removable from the rod when the hook lies in a position generally parallel to the inner side of the tire under the vehicle, said chain setup also including anti-skid chain means and means for connecting the chain setup with the mounting member at the outside of the rim.

References Cited in the file of this patent
UNITED STATES PATENTS

| | | |
|---|---|---|
| 2,074,534 | Briggs | Mar. 23, 1937 |
| 2,171,592 | Nagle | Sept. 5, 1939 |
| 2,186,475 | Briggs | Jan. 9, 1940 |